United States Patent
Hack

(10) Patent No.: US 7,697,677 B2
(45) Date of Patent: Apr. 13, 2010

(54) METHOD FOR CALL DISTRIBUTION IN A CALL CENTER AND ASSOCIATED CALL DISTRIBUTION APPARATUS

(75) Inventor: Andreas Hack, Pfaffenwiesbach (DE)

(73) Assignee: Siemens Aktiengesellschaft, Munich (DE)

( * ) Notice: Subject to any disclaimer, the term of this patent is extended or adjusted under 35 U.S.C. 154(b) by 2103 days.

(21) Appl. No.: 10/098,004

(22) Filed: Mar. 12, 2002

(65) Prior Publication Data

US 2002/0154757 A1   Oct. 24, 2002

(30) Foreign Application Priority Data

Mar. 13, 2001 (DE) .................... 101 11 971

(51) Int. Cl.
*H04M 3/00* (2006.01)
(52) U.S. Cl. .............. 379/265.01; 379/265.02; 379/265.13; 379/266.02
(58) Field of Classification Search ............ 379/265.01, 379/265.02, 265.12, 266.01, 265.07, 265.11, 379/265.13, 266.02, 258
See application file for complete search history.

(56) References Cited

U.S. PATENT DOCUMENTS

| | | | |
|---|---|---|---|
| 5,119,416 A | | 6/1992 | Ortel |
| 5,444,774 A | * | 8/1995 | Friedes ............... 379/266.01 |
| 5,528,678 A | * | 6/1996 | Kaplan ................ 379/265.11 |
| 5,666,401 A | | 9/1997 | Morganstein et al. ......... 67/1 |
| 5,689,552 A | | 11/1997 | Gibilisco |
| 5,825,869 A | * | 10/1998 | Brooks et al. ......... 379/265.12 |
| 5,867,562 A | * | 2/1999 | Scherer ................. 379/88.21 |
| 5,999,609 A | | 12/1999 | Nishimura |
| 6,058,435 A | * | 5/2000 | Sassin et al. ............. 719/331 |
| 6,061,433 A | * | 5/2000 | Polcyn et al. ........... 379/93.12 |
| 2003/0195811 A1 | * | 10/2003 | Hayes et al. ............... 705/26 |

FOREIGN PATENT DOCUMENTS

| | | |
|---|---|---|
| DE | 32 25 562 | 1/1984 |
| DE | 35 01 814 | 7/1985 |
| DE | 199 53 272 | 5/2001 |
| DE | 100 22 089 | 11/2001 |
| EP | 1 022 890 | 7/2000 |

* cited by examiner

*Primary Examiner*—Quochien B Vuong
(74) *Attorney, Agent, or Firm*—King & Spalding L.L.P.

(57) ABSTRACT

A method for call distribution is disclosed, where an incoming call is forwarded by a switching device to a call distribution device via dialing information input by the caller. The call distribution apparatus device checks whether the dialing information contains permissible inquiry information. If this is not so, the caller is requested to input inquiry information by an interactive voice response device. The call distribution apparatus causes the call to be switched to an agent responsible for the specified inquiry via the switching device via the inquiry information contained in the dialing information or interrogated by the voice response device.

11 Claims, 1 Drawing Sheet

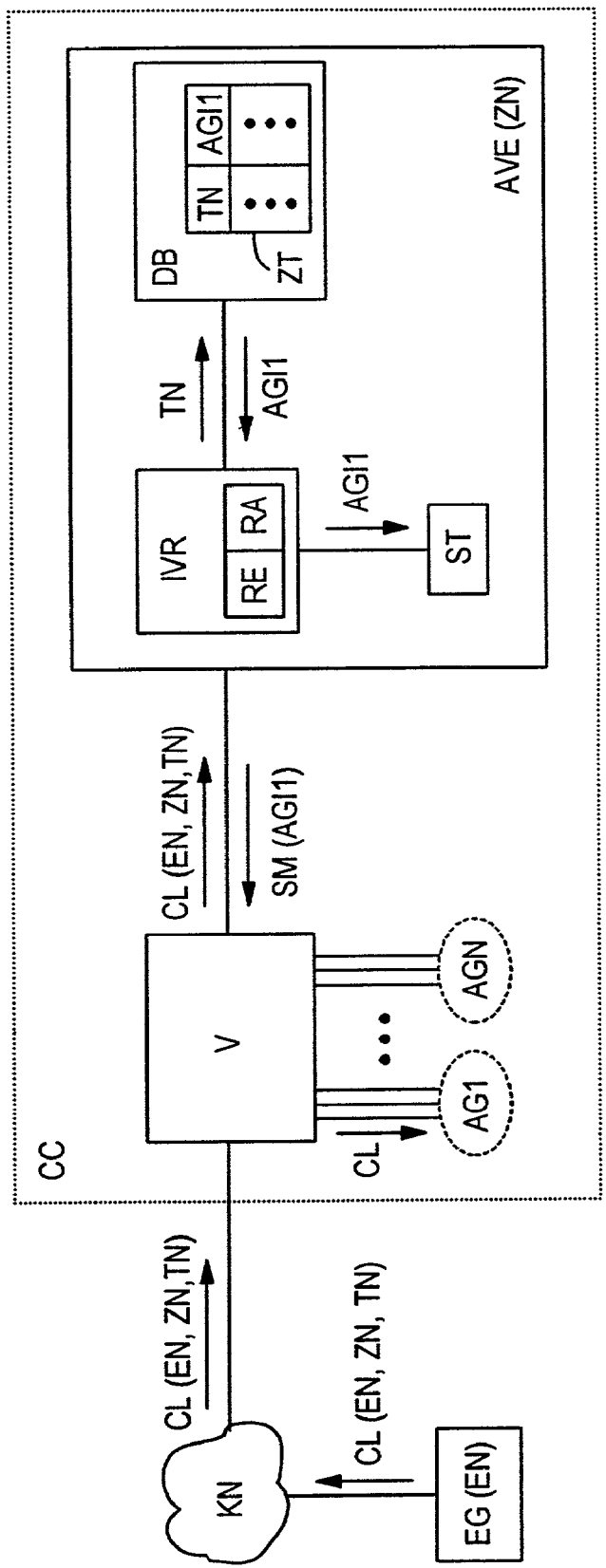

METHOD FOR CALL DISTRIBUTION IN A CALL CENTER AND ASSOCIATED CALL DISTRIBUTION APPARATUS

BACKGROUND OF THE INVENTION

Call centers are gaining increasing significance in the considerable expansion of communication capabilities currently taking place. As a rule, such a call center has a call distribution device via which incoming calls are switched to a multiplicity of so-called agents who or which process the incoming calls. As a rule, agents are persons, but they also can be other information sources such as a database, a voice dialog system, a voice response device, recorded announcement machines or fax machines. Call centers can be used in many different ways; e.g., for customer service by telephone or for other services which can be provided by telephone.

A call distribution device of a call center is frequently called an ACD (Automatic Call Distribution) unit. Such a call distribution device essentially has the task of accepting the incoming calls and either forwarding them to a free agent or, if no agent is available, entering the call into a waiting loop.

Up to date call centers frequently have an interactive voice dialog or voice response device which accepts an incoming call in order to interrogate the caller for inquiry information on the purpose or the type of intended inquiry. Such a voice dialog device is frequently called an IVR (Interactive Voice Response) device. Such inquiry information can specify, for example, a certain process, task, agent, a request or a serving or processing category. Such inquiry information is frequently called ticket number. Depending on the inquiry information interrogated, the incoming call is subsequently switched to an agent responsible for the specified inquiry.

According to the prior art, if no responsible agent is currently available after the interrogation of an inquiry information item, the caller must remain in a waiting loop until a responsible agent becomes available. Since the waiting takes place with the connection established, call charges are continuously incurred during the waiting time and, as a rule, debited to the caller. In addition, existing connections in the waiting state occupy information data channels and other system resources of the call center in a nonproductive manner.

It is an object of the present invention, therefore, to specify a method for call distribution in a call center which permits incoming calls to be distributed more efficiently. It is also an object of the present invention to specify a call distribution apparatus for implementing the method according to the present invention.

SUMMARY OF THE INVENTION

Accordingly, an advantage of the present invention is that incoming calls need not necessarily be accepted by an interactive voice response device for interrogating inquiry information if this inquiry information is already contained in a dialing information input by the caller, as provided according to the present invention. In such a case, an incoming call can be relayed directly to the relevant agent via the inquiry information contained in the dialing information without call charges being incurred up to the acceptance of the call by the agent.

A further advantage of the method according to the present invention can be seen in the fact that no intervention in an existing switching device is required in order to perform this method.

According to one advantageous embodiment of the present invention, the call is relayed to the relevant agent in the ringing state if the inquiry information is already contained in the dialing information. As long as the call is in the ringing state, no call charges are incurred. In the ringing state, a ringing tone, such as the call connected signal, can be transmitted to the caller.

Furthermore, the call distribution apparatus can detect a source call number of the caller; e.g., as part of the ANI (Automatic Number Identification) or CLI (Calling Line Identification) feature. Source call numbers of callers detected can be used, for example, for allocating the callers to different authorization or user groups. Calls then can be relayed to a respective responsible agent in dependence on a respective source call number detected.

According to a further advantageous embodiment of the present invention, a call is relayed to the call distribution apparatus via a first part of the dialing information and the check with regard to the inquiry information is done via a second part of the dialing information. If the dialing information includes a call number, the first or second dialing information can preferably consist of a respective predetermined number of the higher-order or low-order digits of this call number.

According to one particularly advantageous embodiment of the present invention, the second part of the dialing information can be formed in the manner of a direct dialing number. In this case, the second part of the dialing information is interpreted as direct dialing number by the switching device and forwarded to the call distribution apparatus identified by the first part of the dialing information. The second part of the dialing information, or the direct dialing information, is then evaluated only in the call distribution apparatus and interpreted as inquiry information or ticket number, respectively, in order to relay the call to an agent responsible for it. In this embodiment of the present invention, a caller can enter a ticket number in a simple manner as a direct dialing number following a call number of the call center in order to be automatically connected to an agent responsible for this ticket number.

According to another embodiment of the present invention, the call distribution apparatus, via the inquiry information, can cause the call to be switched to a destination identified by a call transfer number instead of to a responsible agent. Such a destination identified by a call transfer number can be, for example, an external or internal terminal, another call distribution apparatus or an external call center.

A database can be provided in the call distribution device for dynamically administering a multiplicity of inquiry information items, such as in the form of direct dialing numbers or ticket numbers, which change in continuous operation and which are, in each case, allocated to at least one responsible agent and/or at least one call transfer number. The database preferably can be updated via the switching device in continuous operation. In this way, updating of the database, such as setting, deleting or changing the allocation of a ticket number, can be performed by a respective responsible agent in continuous operation.

According to another embodiment of the present invention, the call distribution device also can be integrated in the switching device.

Additional features and advantages of the present invention are described in, and will be apparent from, the following Detailed Description of the Invention and the Figures.

BRIEF DESCRIPTION OF THE FIGURES

FIG. 1 shows a call center connected to a communication network in a diagrammatic representation.

DETAILED DESCRIPTION OF THE INVENTION

FIG. 1 diagrammatically shows a call center CC which includes a switching device V and a call distribution apparatus AVE. The call center CC is connected to a communication network KN, such as a public ISDN network, via the switching device V. In FIG. 1, a terminal EG coupled to the communication network KN and having the terminal number EN is also shown by way of example.

The switching device V is connected to a multiplicity of agent terminals which are allocated to various agent groups AG1, ..., AGN; if necessary, dynamically. A respective agent group AG1, ..., AGN is, in each case, responsible for certain inquiries to the call center CC allocated to it and in each case includes one or more agents.

The call distribution apparatus AVE is connected to the switching device V via a trunk line capable of direct dialing; e.g., with $S_{2M}$ interface. Instead of the $S_{2M}$ interface, an $S_0$ interface, a so-called voice-over IP interface or another interface with voice channel also can be used. A call number ZN via which the call distribution apparatus AVE can be dialed from the communication network KN is allocated to the call distribution apparatus AVE within the switching device. From the point of view of an external caller, the call number ZN can correspond to a predetermined service call number of the call center CC. The call distribution apparatus AVE is preferably implemented via a personal computer with trunk access.

The call distribution apparatus AVE exhibits an interactive voice response device IVR, a database DB and a control device ST as functional components. The voice response device IVR has a call number detection device RE and a call number evaluating device RA and is preferably constructed as voice dialog device. The database DB and the control device ST are, in each case, coupled to the voice response device IVR. The functional components of the call distribution apparatus AVE preferably can be implemented as software or CTI (Computer Telephony Integration) applications running on it.

To control switching functions of the switching device V, the voice response device IVR is coupled to the switching device V preferably via a so-called TCP/IP (Transmission Control Protocol/Internet Protocol) socket interface on which a so-called CSTA (Computer Supported Telephony Application) interface or a so-called TAPI (Telephone Application Programming Interface) is implemented.

The database DB, in turn, exhibits one or more allocation tables ZT in which different ticket numbers TN, ... are, in each case, allocated to one agent group information item AGI1, .... The ticket numbers TN, ... can be, for example, task numbers, product numbers, process numbers, processing numbers, problem identification numbers, request numbers or inquiry numbers as part of different serving tasks of the call center cc. An agent group information item AGI1, ... allocated to a ticket number TN, ... specifies and/or identifies an agent group AG1, ... AGN responsible for processing this ticket number. The agent group information AGI1, ... can be allocated both directly and indirectly to a ticket number TN, .... In the case of an indirect allocation, a ticket number TN can be allocated, such as in a first one of the allocation tables ZT, to a product group which, in turn, is allocated, in a second one of the allocation tables ZT, to a serving and/or capabilities profile which, finally, is allocated, in a third one of the allocation tables ZT, to a correspondingly qualified agent group. If necessary, one or more allocation tables also can be provided in which predetermined terminal call numbers of calling terminals are allocated to certain agent groups or in which the correlation between ticket numbers and agent group information items is dependent on the terminal call number of a calling terminal.

The allocation tables ZT and the ticket numbers TN, ... are dynamically administered by the voice response device IVR. Dynamic administration of the ticket numbers TN, ... is required since the ticket numbers TN, ... are only temporarily allocated in most cases. As a rule, ticket numbers are deleted and/or reissued for other purposes after a relevant inquiry has been processed by a responsible agent. For this reason, the database DB is coupled to the voice response device IVR in such a manner that the ticket numbers TN, ... stored in the database DB and their correlation with agent groups can be updated from the agent terminals in continuous operation via the switching device V and the voice response device IVR.

According to an advantageous variant of the implementation of the present invention, two different databases (not shown) can be provided instead of the single database DB in the call distribution apparatus AVE. A first one of these databases then can be used for storing fixed allocations of ticket numbers to agent groups or other static correlations, such as between ticket numbers, product numbers, agent capabilities and/or agent groups, whereas the second one of these databases is used for storing temporary correlations which frequently change. Such a use of different databases for fixed allocations, on the one hand, and changing allocations, on the other hand, allows more flexible maintenance of stored data and increases the operational reliability.

In the text which follows, an inquiry of an external caller is considered in the context of the present exemplary embodiment. It will be assumed, by way of an example, that the inquiry relates to a process identified by ticket number TN. Ticket number TN may have been assigned to the caller, for example, during an earlier inquiry.

The caller calls the call center CC via the communication network KN from the terminal EG. For this purpose, the caller inputs the call number ZN immediately followed by the ticket number TN as dialing information at the terminal EG. As a consequence, a call CL is switched by the communication network KN to the switching device V of the call center CC. As part of the call CL, the terminal EG transmits its terminal call number EN and the dialing information input, that is the call number ZN and the ticket number TN, to the switching device V. The switching device V then analyzes the transmitted dialing information as part of its usual switching functions. During this process, the call number ZN is recognized as call number of the call distribution apparatus AVE. In addition, the ticket number TN is interpreted as direct dialing number which must be further evaluated as such in the call distribution apparatus AVE identified by the call number ZN. A fixed number of digits can be predetermined in each case for a respective call number or direct dialing number in the switching device V.

After the dialing information has been evaluated, the call CL is forwarded in the ringing state, that is, before an actual connection is set up, to the call distribution apparatus AVE identified by the call number ZN by the switching device V. During this process, the call CL is switched to the voice response device IVR, the call number detection device RE of which detects the dialing information transmitted with the call CL. The destination call number ZN and the direct dialing number TN can be detected, for example, via the so-called DNIS (Dialed Number Identification Service). The terminal call number EN of the calling terminal EG, also transmitted to the voice response device IVR during the call CL, also can be detected with the aid of the so-called AM (Automatic Number Identification) or CLI (Calling Line Identification) feature.

The call number evaluating device RA first checks whether the dialing information detected contains a direct dialing number. If this is so, the call number evaluating device RA also checks whether the direct dialing number contained is a valid ticket number. During this evaluation of the dialing information, a ringing tone, such as, a call connected signal, is transmitted back to the calling terminal EG via the switching device V by the voice response device IVR.

In the present exemplary embodiment, the call number evaluating device RA recognizes that the dialing information contains the direct dialing number TN. To check this direct dialing number TN, an inquiry message containing the direct dialing number TN is transmitted to the database DB. As a result, the allocation tables ZT search for the transmitted direct dialing number TN in the database DB. If, as in the present exemplary embodiment, an entry is found via which the transmitted direct dialing number TN is allocated to an agent group information item, the associated agent group information, in this case AGI1, is transmitted to the voice response device IVR. If not, a failure message is transmitted to the call number evaluating device RA.

If necessary, the terminal call number EN of the calling terminal EG also can be transmitted to the database DB in order to select agent group information in dependence on the source call number of the calling terminal.

It is only if the call number evaluating device RA does not detect any direct dialing information in the dialing information or receives a failure message from the database DB during the validity check, that the call CL is accepted by the voice response device IVR. After the call CL has been accepted, a voice dialog is carried out, during which the voice response device IVR audibly requests the caller to input a ticket number. During this process, the caller can be requested, for example, to input the ticket number via a call number keypad of his/her terminal EG or also to input the ticket number by voice. To evaluate a ticket number spoken by the caller, a voice recognition device (not shown) can be provided in the voice response device IVR. After the ticket number has been input, its validity is checked via a database inquiry as explained above. If the result of the check is negative, the caller is again requested to input a valid ticket number. After a valid ticket number has been detected, the call CL can be put back into the ringing state, or into a connectionless state, until accepted by a responsible agent.

A valid ticket number is recognized by the call number evaluating device RA by the fact that an agent group information item allocated to this ticket number is transmitted by the database DB. The transmitted agent group information specifies and identifies the agent group which is responsible for processing the process identified by this ticket number.

In the present exemplary embodiment, the agent group information AGI1 allocated to the ticket number TN is transmitted to the call number evaluating device RA by the database DB, as a result of which the ticket number TN is recognized as valid. In consequence, the agent group information AGI1 is transmitted to the control device ST by the voice response device IVR. The control device ST thereupon causes the call CL to be transferred to the agent group AGI1 identified by the agent group information AGI1 in the ringing state. For this purpose, a control message SM containing the agent group information AGI1 is transmitted via the abovementioned CSTA or TAPI interface to the switching device V. The control message SM causes the switching device V to switch the call CL through to a free agent of the agent group AGI1 or, if no agent of this agent group AGI1 is currently free, to enter the call CL into a queue allocated to this agent group AGI1.

Since the call CL is switched to the responsible agent in the ringing state, no call charges are incurred until the call CL has been actually accepted by the agent. In addition, no information data channels are occupied up to this point if the switching device can perform a route optimization.

After the call CL has been processed by the responsible agent, the latter can delete the ticket number TN in the database DB. If necessary, the responsible agent can also issue a new ticket number to the caller, set it in the database DB and allocate it to an agent group, which may differ from agent group AG1.

Although the present invention has been described with reference to specific embodiments, those of skill in the art will recognize that changes may be made thereto without departing from the spirit and scope of the present invention and set forth in the hereafter appended claims.

The invention claimed is:

1. A method for call distribution in a call center, comprising:
   forwarding an incoming call to a call distribution apparatus by a switching device via dialing information input by a caller;
   checking, via the call distribution apparatus, whether the dialing information includes a permissible inquiry information item specifying an inquiry and, if not, requesting the caller to input the inquiry information via an interactive voice response device, wherein if dialing information includes the permissible inquiry information item specifying the inquiry, the interactive voice response device is bypassed; and
   causing the incoming call to be switched, by the call distribution device and using the inquiry information, to an agent responsible for the specified inquiry via the switching device.

2. A method for call distribution in a call center as claimed in claim 1, wherein, if the inquiry information is already contained in the dialing information, the incoming call is switched to the responsible agent in a ringing state.

3. A method for call distribution in a call center as claimed in claim 1, further comprising:
   detecting a source call number of the caller by the called distribution apparatus; and
   switching the incoming call depending on the source call number detected.

4. A method for call distribution in a call center as claimed in claim 1, further comprising:
   forwarding the incoming call to the call distribution apparatus via a first part of the dialing information; and
   checking the call with regard to the inquiry information via a second part of the dialing information.

5. A method for call distribution in a call center as claimed in claim 1, wherein the call distribution apparatus, via the inquiry information, causes the incoming call to be switched to a destination identified by a call transfer number, instead of to the responsible agent.

6. A method for call distribution in a call center as claimed in claim 1, wherein a plurality of inquiry information items, which change in continuous operation and which are respectively allocated to at least one of at least one responsible agent and at least one call transfer number, are dynamically administered in the call distribution apparatus.

7. A call distribution apparatus for coupling to a switching device, comprising:
   a detection part for detecting dialing information included in a call signaling of an incoming call;

an evaluating part for checking whether the detected dialing information includes permissible inquiry information specifying an inquiry;

an interactive voice response device for voice-controlled interrogation of an inquiry information item from a caller; and a control device for relaying the call via the inquiry information, which is one of contained in the dialing information and interrogated from the caller, via the switching device to an agent responsible for the specified inquiry, wherein if the dialing information contains the permissible inquiry information item specifying the inquiry, the voiced-controlled interrogation performed by the interactive voice response device is bypassed.

8. A call distribution apparatus for coupling to a switching device as claimed in claim 7, wherein the voice response device includes a voice recognition unit for converting spoken inquiry information into inquiry data.

9. A call distribution apparatus for coupling to a switching device as claimed in claim 8, wherein the control device relays the call to a destination identified by a call transfer number via the switching device and via the inquiry information which is one of contained in the dialing information and interrogated from the caller.

10. A call distribution apparatus for coupling to a switching device as claimed in claim 7, further comprising a database, which can be updated in continuous operation via the switching device for storing a correlation of changing, dynamically administered inquiry information items with, in each case, at least one of at least one responsible agent and at least one call transfer number.

11. A call distribution apparatus for coupling to a switching device as claimed in claim 7, further comprising a Computer-Supported Telephony Application (CSTA) interface coupled to the switching device.

* * * * *